(12) United States Patent
Overby

(10) Patent No.: US 7,747,818 B1
(45) Date of Patent: Jun. 29, 2010

(54) MEDIA PROTECTION NOTIFICATION FOR SERIAL INTERFACE MASS STORAGE DEVICES

(75) Inventor: Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 496 days.

(21) Appl. No.: 11/611,781

(22) Filed: Dec. 15, 2006

Related U.S. Application Data

(60) Provisional application No. 60/822,632, filed on Aug. 16, 2006.

(51) Int. Cl.
*G06F 13/00* (2006.01)

(52) U.S. Cl. .......................... 711/112; 360/60; 360/69; 360/75

(58) Field of Classification Search .................. 711/112; 360/75
See application file for complete search history.

(56) References Cited

U.S. PATENT DOCUMENTS

| | | | |
|---|---|---|---|
| 6,046,877 A * | 4/2000 | Kelsic ......................... | 360/75 |
| 6,236,527 B1 | 5/2001 | Uchiike et al. | |
| 6,429,990 B2 * | 8/2002 | Serrano et al. ................ | 360/60 |
| 6,570,726 B2 * | 5/2003 | Mutoh .......................... | 360/60 |
| 7,023,640 B1 * | 4/2006 | Codilian et al. ............... | 360/60 |
| 7,042,663 B2 | 5/2006 | Shimotono et al. | |
| 7,154,692 B2 * | 12/2006 | Ogawa et al. ................. | 360/61 |
| 7,328,615 B2 * | 2/2008 | Kwon et al. .................. | 73/488 |
| 7,369,345 B1 * | 5/2008 | Li et al. ........................ | 360/75 |
| 7,450,332 B2 * | 11/2008 | Pasolini et al. ................ | 360/75 |
| 2007/0253091 A1 | 11/2007 | Jeansonne et al. | |
| 2008/0005594 A1 | 1/2008 | Adams et al. | |
| 2009/0021858 A1 * | 1/2009 | Fu et al. .................. | 360/99.01 |
| 2009/0027798 A1 * | 1/2009 | Shu et al. ...................... | 360/75 |

\* cited by examiner

*Primary Examiner*—Hetul Patel
(74) *Attorney, Agent, or Firm*—Patterson & Sheridan, LLP

(57) ABSTRACT

One embodiment of the present invention sets forth a technique for reducing the latency associated with media protection notification for serial interface mass storage devices, such as serial AT attachment (SATA) hard disk drives. A new link layer primitive, referred to as hold-emergency (HOLDE), incorporates the flow-control behavior of the existing HOLD command, with the additional new action of notifying the hard disk drive to take emergency steps to prepare for impact. The HOLDE link layer primitive operates in conjunction with the existing hold-acknowledge (HOLDA) primitive and is semantically similar to the existing HOLD primitive. The HOLDE mechanism is preferably implemented directly in hardware in the SATA link layer state machines within the host and the hard disk drive.

11 Claims, 3 Drawing Sheets

MEDIA PROTECTION NOTIFICATION FOR SERIAL INTERFACE MASS STORAGE DEVICES

CROSS-REFERENCE TO RELATED APPLICATIONS

This application claims the priority benefit of United States provisional patent application titled "MEDIA PROTECTION NOTIFICATION FOR SERIAL INTERFACE MASS STORAGE DEVICES," having U.S. provisional application No. 60/822,632, and filed Aug. 16, 2006.

BACKGROUND OF THE INVENTION

1. Field of the Invention

Embodiments of the present invention relate generally to mass storage systems and, more specifically, to media protection notification for serial interface mass storage devices.

2. Description of the Related Art

Modern computer systems commonly include a mass storage device, such as a hard disk drive, that is used to store operating system images, application programs and user data. Hard disk drives are electromechanical devices that include one or more disk-shaped platters used to store data in concentric tracks on a magnetically readable and writeable surface. Each hard disk drive typically has an actuator that positions a set of one or more read/write heads above a selected track. The spinning motion of the disk allows the read/write head to access any data stored on the selected track by "flying" above the track until the desired data passes under the read/write head. In normal use, the read/write head is continually positioned above the platter, providing constant read/write access to the data stored thereon. However, if the hard disk drive is subjected to a mechanical shock (a "high-g" event) while the read/write head is positioned above the spinning platter, damage may occur to the hard disk drive. Such damage may range in severity from minor surface damage and localized loss of data through a catastrophic head failure that renders the hard disk drive inoperable. Hard disk drives that are used within mobile computing devices, such as laptop computers and personal digital assistants (PDAs), are especially prone to mechanical shock damage from high-g events because the whole mobile computing device spends a great deal of time being carried about, which places the entire device at risk.

Fortunately, hard disk drives are significantly less susceptible to damage when the read/write head is safely positioned away from the spinning platter in a state referred to as "parked." In order to exploit a more robust parked state, the hard disk drive needs to be able to transition from an active state to the parked state before an impact occurs. AT attachment (ATA) hard disk drives include a transport layer command, referred to as "IDLE IMMEDIATE," that attempts to idle the hard disk drive as quickly as possible when a high-g event occurs. The hope in using the IDLE IMMEDIATE command is that hard disk drive may be able to park the read/write heads before impact. The IDLE IMMEDIATE command parks the read/write heads and aborts any ATA commands that are in progress.

Current generation ATA drives use a serial link interface, referred to as serial ATA (SATA). The SATA interface uses two high-speed serial links to communicate with a host controller. ATA commands are encapsulated within sequential frames of serial data that are transmitted over the first of the two serial links. The second serial link carries data transmitted from the hard disk drive back to the host controller. The SATA standard uses a well-known physical link layer protocol, known as "8b/10b" that encodes eight bits of payload using ten bits of transmitted code. Thus, a SATA hard disk drive may receive a transport layer IDLE IMMEDIATE command over the first serial link and respond by parking the read/write heads and aborting any ATA commands that are in progress.

One approach to averting damage from a high-g event involves using a multi-axis accelerometer, such as a three-axis accelerometer, to sense a transition to zero-gravity (free fall) or a transition to high-gravity about an axis (spinning fall) and then to notify management software within the computing device to issue an IDLE IMMEDIATE command to any spinning hard disk drives. For example, when a laptop flips over the edge of a desk, the accelerometer detects a likely high-g event from a spinning fall and the accelerometer generates a notification to management software within the computing device. In response, the management software issues an IDLE IMMEDIATE command to the hard disk drive over the SATA physical link, causing the hard disk drive to abort any pending commands and to park the read/write heads as soon as possible. If the computing device is falling far enough to allow the accelerometer notification enough time to travel through the notification software path to the SATA host controller and then to the hard disk drive, the hard disk drive may be able to park its read/write heads in time. After issuing the IDLE IMMEDIATE command, the management software initiates a recovery process whereby aborted commands are discovered and re-issued before processing continues.

One drawback of the current solution is that the IDLE IMMEDIATE command is issued in sequence with other transport layer commands and, therefore, must wait for the current ATA transport layer command to complete before being transmitted to the hard disk drive over the SATA serial link. If the current ATA transport layer command involves transmitting a large block of data, a significant time delay may be introduced between the time software generates the IDLE IMMEDIATE command and when the hard disk drive actually receives the command. Additional delay is introduced in the software path leading from the accelerometer notification to the actual generation of the IDLE IMMEDIATE command. The substantial delay from when the accelerometer senses a possible high-g event to when the hard disk drive is actually able to act on this information through the IDLE IMMEDIATE command decreases the probability that the hard disk drive will be able to remove the read/write heads in time to avoid data loss. A second drawback of the current solution is the inefficiency and additional processing complexity imposed by aborting ATA commands that are already in progress. While the process of aborting ATA commands typically does not lead to user data loss in a properly functioning system, the process of recovering from aborted ATA commands can be time consuming and represents significant implementation and processing complexity.

As the foregoing illustrates, what is needed in the art is a mechanism to remove the read/write heads from disk media more quickly and with less processing disruption when the conditions leading to a high-g event are detected.

SUMMARY OF THE INVENTION

One embodiment of the present invention sets forth a method for protecting a storage device during a high-gravity event. The method includes the steps of receiving a high-gravity event warning signal, stopping data transmissions to the storage device over a serial data stream in response to the high-gravity event warning signal, transmitting a first HOLDE primitive to the storage device over the serial data stream, and determining whether the high-gravity event is finished.

One advantage of the disclosed method is that by providing emergency impact notification and response at a very low level in the SATA protocol stack (the SATA link layer), extremely low notification latencies are achieved. Consequently, the probability that the hard disk drive can successfully prepare for impact prior to the actual impact is increased. Furthermore, with the impact notification and response mechanism acting within the SATA link layer, software is relieved of the complex and time consuming task of discovering and re-issuing SATA commands that were aborted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The following discussion should be read in conjunction with the Serial ATA International Organization Serial ATA Revision 2.5 Specification.

Figure 1:
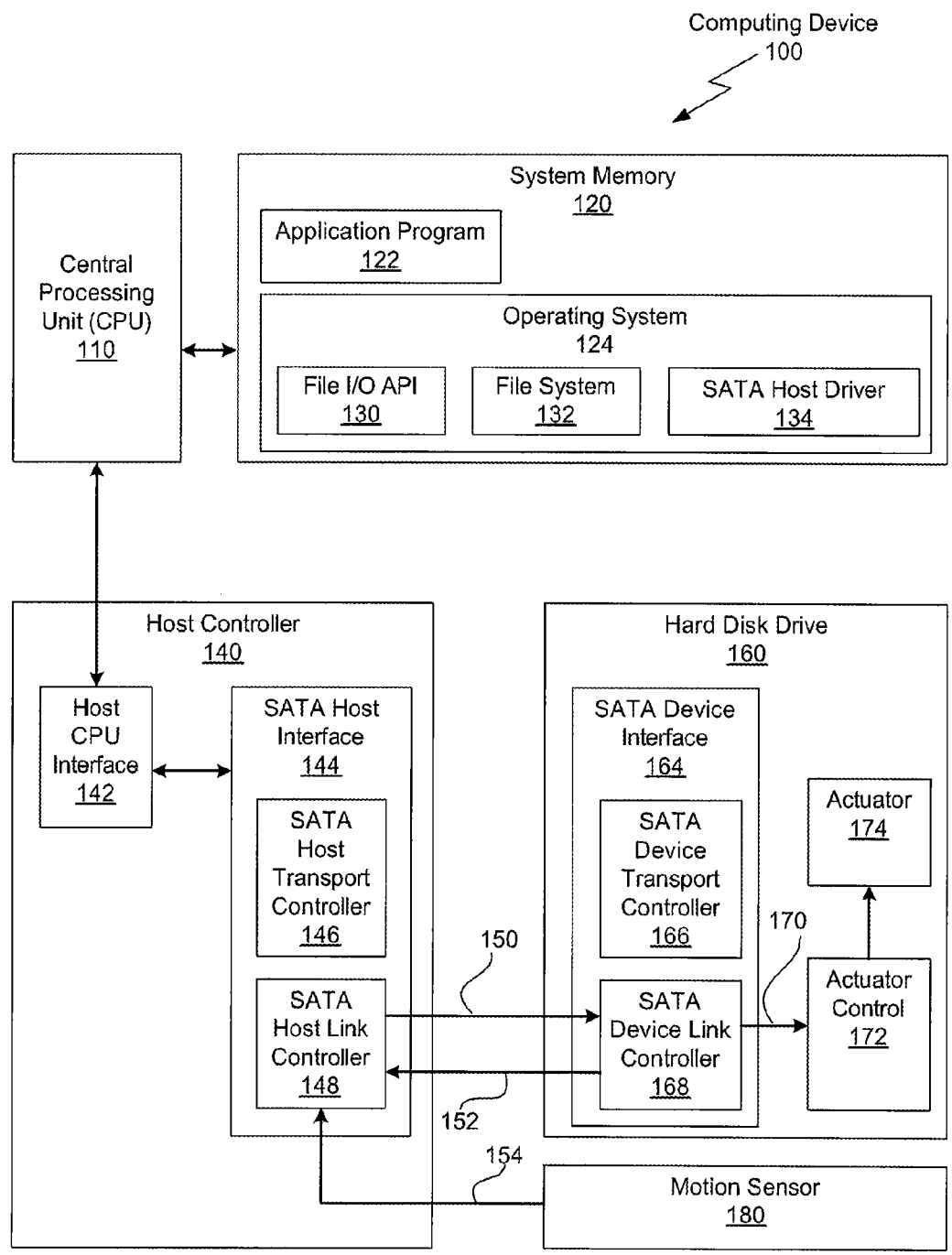
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes, without limitation, a central processing unit 110 (CPU), system memory 120, a host controller 140, a hard disk drive 160 and a motion sensor 180. The CPU 110 provides well-known computational capabilities for executing programming instructions and data processing. The CPU 110 is attached to the system memory 120 and executes programming instructions stored therein. The CPU is also attached to the host controller 140, which provides access to peripheral devices, such as the hard disk drive 160. In alternate embodiments, the CPU 110 and host controller 140 may be integrated into a single device.

The system memory 120 includes an application program 122 and software modules that form an operating system 124. The operating system 124 includes, without limitation, a file input/output (I/O) application programming interface (API) 130, a file system 132 and a SATA host driver 134. The file I/O API 130 exposes a set of high-level access methods used by the application program 122 to access files stored on the hard disk drive 160. The file system 132 implements the high-level access methods exposed by the file I/O API 130. Many different file systems may coexist within the operating system 124, however each file system consistently presents the set of access methods to the application program 122 via the file I/O API 130. The SATA host driver 134 implements the host-side portion of the well-known SATA protocol. The SATA host driver 134 manages data transfers between system memory 120 and the hard disk drive 160 and provides the file system 132 with a read/write block device view of the hard disk 160.

The host controller 140 includes, without limitation, a host CPU interface 142 and a SATA host interface 144. The host CPU interface 142 bridges communication between the CPU 110 and the modules within the host controller 140, such as the SATA host interface 144. The SATA host interface 144 includes a SATA host transport controller 146 and a SATA host link controller 148. The SATA host transport controller 146 implements aspects of the well-known SATA host transport protocol related to SATA transport layer protocol processing. The SATA host link controller 148 implements the well-known SATA link layer functionality and includes extensions to the host link layer state machine, described in greater detail below. The host link controller 148 includes physical layer functionality for transmitting parallel data in the form of a serial stream to the hard disk drive 160 and for receiving data that is formatted as a serial stream from the hard disk drive 160, in accordance with the SATA 2.5 specification.

Outbound parallel data (i.e., data transmitted to the hard disk drive 160) is configured in groups of bytes. A group of four bytes (bytes "0" to "3") is known as a "D-word." The basic unit of data transmission within SATA is a D-word. The data bytes within a D-word are passed through a conversion known in the art as "8b/10b" to encode each eight-bit byte into ten-bit characters. The properties of the ten-bit character stream are highly optimal for serial transmission, enabling efficient serial transmission of data. The host-to-device serial data stream 150 is a serialized version of the ten-bit 8b/10b characters. An additional property of the 8b/10b code is the ability to send control characters that are out of band relative to the data bytes. This property enables SATA link controllers to send control information intermingled with payload data. SATA D-words that convey control information are referred to as link layer primitives, or simply "primitives." This invention introduces a new SATA link layer primitive, referred to as hold-emergency (HOLDE). The HOLDE primitive incorporates the flow-control behavior of the existing HOLD command with additional new behavior described in greater detail herein. TABLE 1 summarizes the SATA primitive table entry for the HOLDE primitive.

TABLE 1

| Primitive Name | Byte 3 Contents | Byte 2 Contents | Byte 1 Contents | Byte 0 Contents |
| --- | --- | --- | --- | --- |
| HOLDE | D21.5 | D21.5 | D10.5 | K28.3 |

The HOLDE primitive is generated within the host-to-device serial data stream 150 when a high-g event warning signal 154 is received by the SATA host link controller 148. From a data flow perspective, relative to the SATA host interface 144, the HOLDE primitive acts similarly to the existing HOLD primitive. However, the HOLDE primitive is transmitted in response to an active indication on the high-g event warning signal 154 rather than in response to a data flow issue, which normally triggers the transmission of a HOLD primitive. Inbound serial data (i.e., data transmitted from the hard disk drive 160) on the device-to-host serial data stream 152 is decoded from 8b/10b format into D-words of data. A HOLDA (hold acknowledge) is normally received in response to the SATA host link controller 148 transmitting either a HOLDE or HOLD on the host-to-device serial data stream 150. TABLE 2 summarizes the description of the HOLDA and HOLDE primitives.

TABLE 2

| Primitive | Name | Description |
|---|---|---|
| HOLDA | Hold acknowledge | This primitive is sent by a transmitter as long the HOLD or HOLDE primitive is received by its companion receiver. |
| HOLDE | Emergency Protection and hold data transmission | HOLDE is transmitted in place of payload data within a frame when the host detects that an event is imminent that requires that the device take protective action. |

The hard disk drive 160 includes, without limitation, a SATA device interface 164, an actuator control 172 and an actuator 174. The SATA device interface 164 includes a SATA device transport controller 166 and a SATA device link controller 168. The SATA device transport controller 166 implements aspects of the well-known SATA host transport protocol related to SATA transport layer protocol processing. The SATA device link controller 168 implements the well-known SATA link layer functionality and includes extensions to the device link layer state machine, described in greater detail below. The device link controller 168 includes physical layer functionality for transmitting parallel data in the form of a serial stream to the host controller 140 and for receiving data that is formatted as a serial stream from the host controller 140, in accordance with the SATA 2.5 specification. When the SATA device link controller 168 receives a HOLDE primitive in the host-to-device serial data stream 150, the SATA device link controller 168 transmits an active signal over the emergency hold signal 170 to the actuator control 172. The SATA device link controller 168 also transmits a HOLDA primitive back to the host via the device-to-host serial data stream 152 to acknowledge reception of the HOLDE primitive.

In normal operation, the actuator control 172 generates control signals to the actuator 174 to precisely position read/write heads within the hard disk drive 160 over a specifically selected track of the magnetic media. The actuator 174 physically moves the read/write heads according to signals generated by the actuator control 172. When the emergency hold signal 170 is active, the actuator control 172 generates the appropriate signals to the actuator 174 to quickly move the read/write heads off the spinning magnetic media and into a safe parked position in preparation for a high-g event. Importantly, the preparation conducted by the hard disk drive 160 prior to a high-g event is not limited to parking the read/write heads. For example, spinning down the media spindle is another example action that may be taken in response to an active emergency hold signal 170.

The motion sensor 180 detects when the computing device 100 is likely to experience a high-g event. An example motion sensor 180 may include a three-axis accelerometer. If the motion sensor detects a state of zero-gravity, as would be the case in a non-spinning free fall, then a high-g event is likely. In another scenario, the motion sensor 180 may detect excessive force about a three-space axis, as would be the case in a spinning fall prior to a high-g event. When a high-g event is likely, the motion sensor 180 activates the high-g event warning signal 154.

Figure 2:
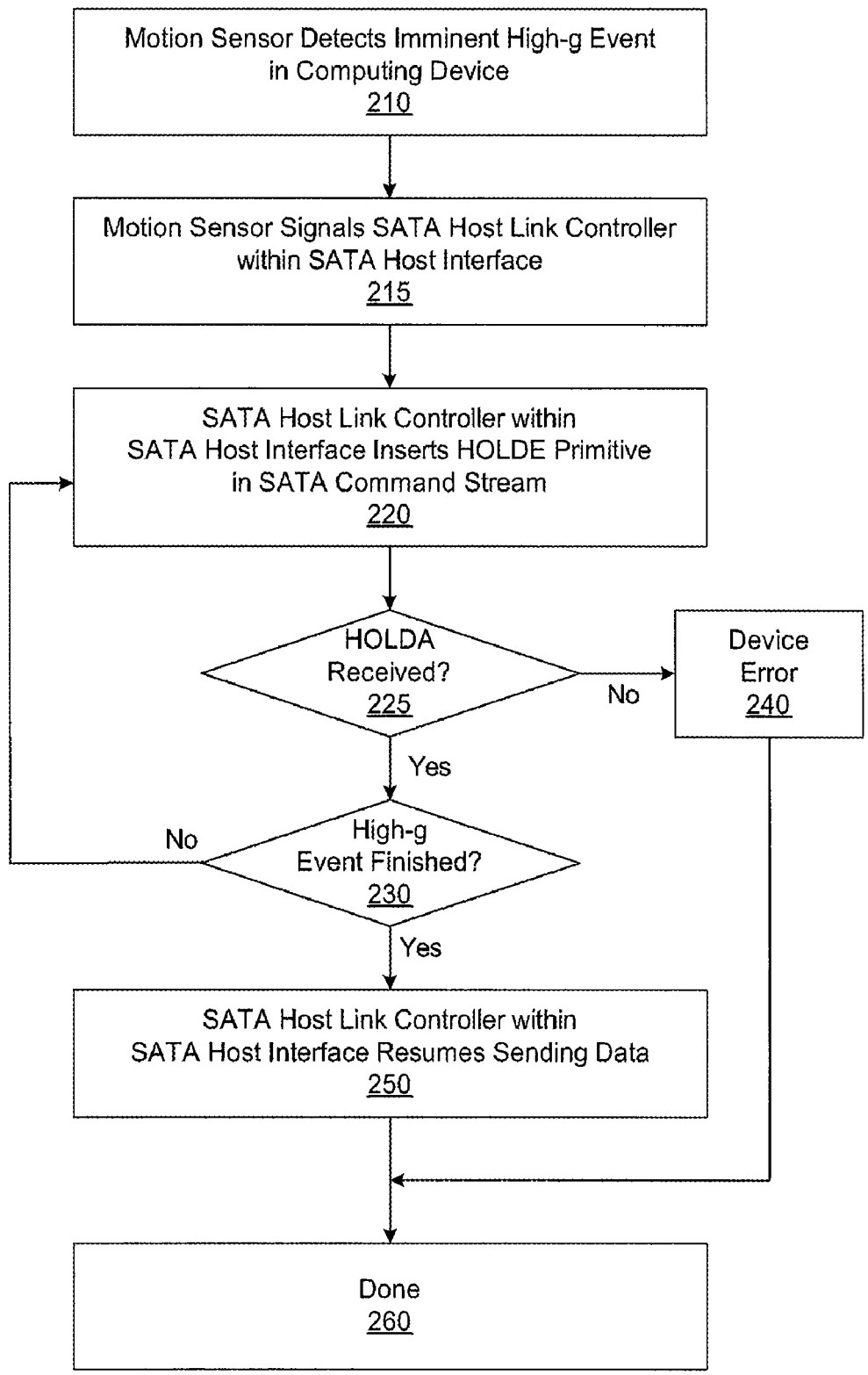
FIG. 2 is a flow diagram of method steps for a SATA host link controller incorporating the HOLDE link layer primitive, according to one embodiment of the invention.

FIG. 2 is a flow diagram of method steps for a SATA host link controller incorporating the HOLDE link layer primitive, according to one embodiment of the invention. Although the method steps are described in conjunction with FIG. 1, persons skilled in the art will understand that any system that performs the method steps, in any order, is within the scope of the invention.

The method of a SATA host link controller transmitting a high-g event warning to a SATA device link controller using the HOLDE primitive begins in step 210, where the motion sensor 180 detects that the computing device 100 is experiencing a high-g event. The method then proceeds to step 215, where the motion sensor 180 signals the SATA host link controller 148 within the SATA host interface 144 to initiate an emergency hold. In step 220, the SATA host link controller 148 within the SATA host interface 144 inserts a HOLDE primitive in the SATA command stream, halting further transmission of data other than HOLDE primitives. For the purpose of data flow control, the SATA host link controller 148 is in a flow control HOLD state. In step 225, if no HOLDA primitive is received by the SATA host link controller 148 to acknowledge the transmitted HOLDE primitive, then the method proceeds to step 240, where a device error is processed. After step 240 the method terminates in step 260.

If, however, in step 225, the SATA host link controller 148 receives a HOLDA primitive, then the method proceeds to step 230. In step 230, if the high-g event is not finished, then the method returns to step 220, where the SATA host link controller 148 inserts another HOLDE primitive in the SATA command stream. In step 230, if the high-g event is finished, then the method proceeds to step 250, where the SATA host link controller 148 within the SATA host interface resumes sending data normally in the SATA command stream. The high-g event may be determined to be finished using any technically feasible means, including a basic time out or count down procedure. The method then terminates in step 260.

TABLE 3 illustrates additions to the existing "link idle" state diagram. The newly added state transitions, labeled "1" and "2," are underlined. If the link state controller state machine is operating on the host side, then arc "1," specified in TABLE 3, is followed by the SATA host link controller 148. Note that prior to moving to the LH_HOLDE state, the SATA host link controller 148 saves the current link layer state in a register referred to as the LH_HOLDE_PREV_STATE register. If the link state controller state machine is operating on the device side, then arc "2," specified in TABLE 3, is followed by the SATA device link controller 168. Note that prior to moving to the LH_HOLDE state, the SATA device link controller 168 saves the current link layer state in a register referred to as the LD_HOLDE_PREV_STATE register.

TABLE 3

| L1: L_IDLE | Transmit SYNCP |
|---|---|
| 1. Host indication of potential high-G impact event and HOLDE enabled and PHYRDY | → LH_HOLDE |
| 2. Drive phy layer forwards HOLDE and PHYRDY | → LD_HOLDE |
| 3. Transport layer requests frame transmission and PHYRDY | → HL_SendChkRdy or DL_SendChkRdy |
| 4. Transport layer requests transition to Partial and PHYRDY | → L_TPMPartial |
| 5. Transport layer requests transition to Slumber and PHYRDY | → L_TPMSlumber |
| 6. X_RDYP received from Phy | → L_RcvWaitFifo |
| 7. Phy layer forwards (PMREQ_PP or PMREQ_SP) and power modes are enabled and acceptable | → L_PMOff |
| 8. Phy layer forwards (PMREQ_PP or PMREQ_SP) and power modes are not enabled or are unacceptable | → L_PMDeny |
| 9. Phy layer forwards AnyDword other than | → L_IDLE |

TABLE 3-continued

| L1: L_IDLE | Transmit SYNCP |
|---|---|
| (X_RDYP or PMREQ_PP or PMREQ_SP) and no transmit request from Transport layer | |
| 10. PHYRDYn | → L_NoCommErr |

TABLE 4 illustrates the state transitions used by the SATA host link controller 148 while in the LH_HOLDE state. The SATA host link controller 148 may enter the LH_HOLDE state from any link state when the SATA host link controller 148 receives an active high-g event warning signal 154. Again, newly added state transitions are underlined.

TABLE 4

| L3: LH_HOLDE | Transmit HOLDE |
|---|---|
| 1. Host indication of potential high-G impact event and PHYRDY | → LH_HOLDE |
| 2. Potential or High-G impact event no longer exists and PHYRDY and the previous state was not L_SEND_SATA or L_SEND_HOLD | → LH_HOLDE_PREV_STATE |
| 3. Potential or High-G impact event no longer exists and PHYRDY | → LH_SEND_HOLDS |
| 4. PHYRDYn | → L_NoCommErr |

The SATA host link controller 148 alternates state between the LH_HOLDE state and the LH_SEND_HOLDS state, according to the transitions specified in TABLE 4 and in TABLE 5, set forth below. TABLE 5 illustrates the LH_SEND_HOLDE state transitions used by the SATA host link controller 148. As with the other tables, newly added state transitions are underlined.

TABLE 5

| L4: LH_SEND_HOLDS | Transmit HOLD |
|---|---|
| 1. Host indication of potential high-G impact event and PHYRDY | → LH_HOLDE₁ |
| 2. Less than 60 HOLD primitives transmitted in this state and PHYRDY | → LH_SEND_HOLDS |
| 3. 60 HOLD primitives transmitted in this state and PHYRDY | → LH_HOLDE_PREV_STATE |
| 4. HOLD detected from the drive and PHYRDY | → LH_HOLDE_PREV_STATE |
| 5. PHYRDYn | → L_NoCommErr |

Figure 3:
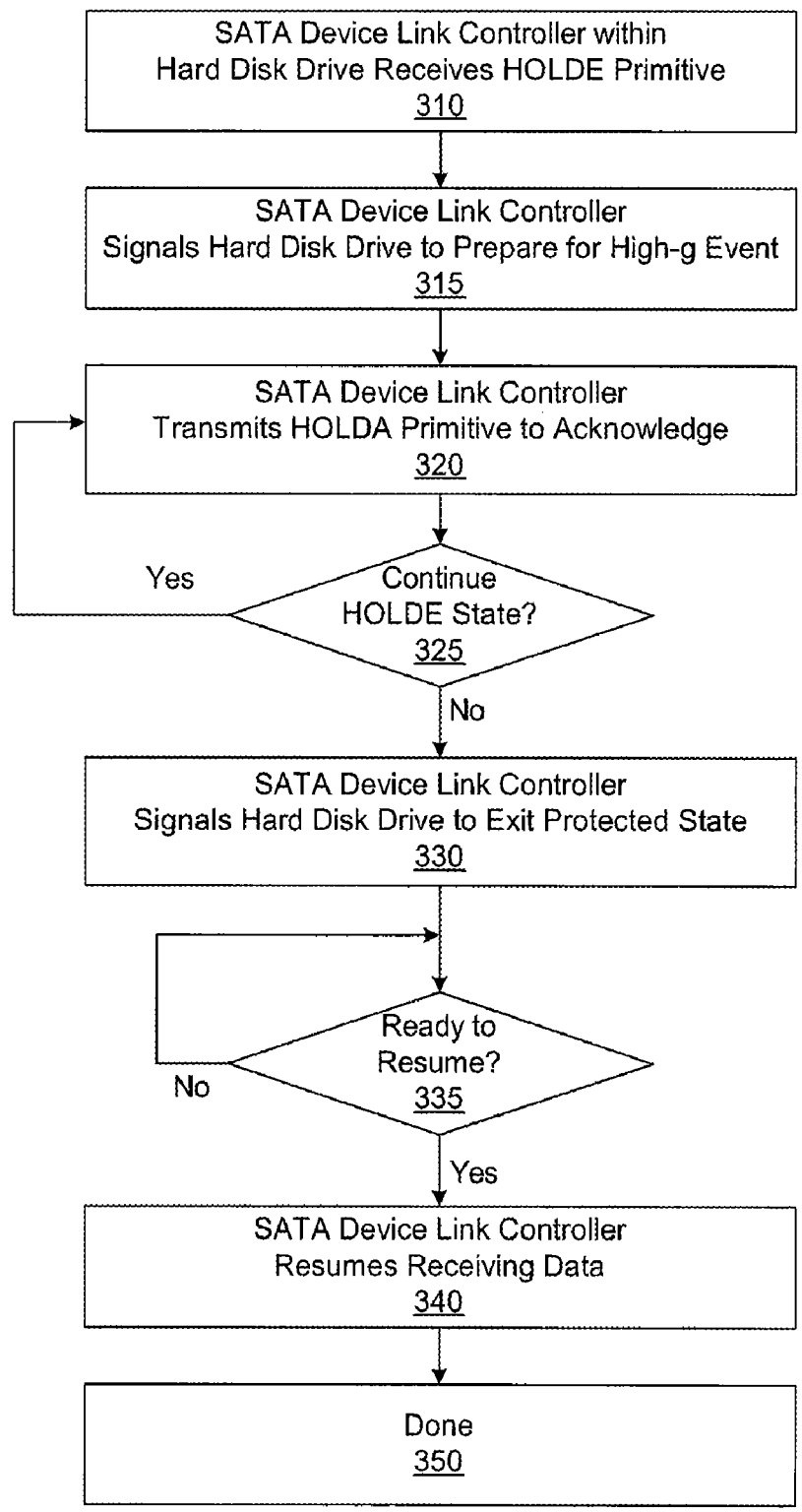
FIG. 3 is a flow diagram of method steps for a SATA device link controller incorporating the HOLDE link layer primitive, according to one embodiment of the invention.

FIG. 3 is a flow diagram of method steps for a SATA device link controller incorporating the HOLDE link layer primitive, according to one embodiment of the invention. Although the method steps are described in conjunction with FIG. 1, persons skilled in the art will understand that any system that performs the method steps, in any order, is within the scope of the invention.

The method of a SATA device link controller receiving a high-g event warning using the HOLDE primitive begins in step 310, where SATA device link controller 168 within the hard disk drive 160 receives a HOLDE primitive transmitted by the SATA host link controller 148. The method proceeds to step 315, where the SATA device link controller 168 signals the hard disk drive 160 to prepare for a high-g event. More specifically, the actuator controller 172 receives the preparation signal from SATA device link controller 168 and then causes the actuator 174 to remove all read/write heads from storage media within the hard disk drive 160. The actuator controller 172 may also cause any spinning storage media to spin down. During this protected state, the SATA device link controller 168 is said to be in a HOLDE state. In step 320, the SATA device link controller 168 transmits a HOLDA primitive to acknowledge the received HOLDE primitive. In step 325, if the SATA device link controller 168 determines that it should continue to stay in the HOLDE state, according to the state transition rules set forth below in TABLE 6, then the method proceeds to step 320.

If, however, in step 325, the SATA device link controller 168 determines that it should not continue to stay in the HOLDE state, according to the state transition rules set forth below in TABLE 6, then the method proceeds to step 330. In step 330, the SATA device link controller 168 signals the hard disk drive 160 to exit the protected state and continue operating. In step 335, a wait cycle is implemented until the hard disk drive 160 is ready to resume normal operation. In step 340, the SATA device link controller 168 resumes receiving data, and the hard disk drive 160 resumes normal operation. The method then terminates in step 350.

TABLE 6 sets forth the state transition properties of SATA device link controller 168 with respect to the LD_HOLDE state. The SATA device link controller 168 enters the LD_HOLDE state when the SATA device link controller 168 receives a HOLDE primitive. So long as the SATA device link controller 168 continues to receive sequential HOLDE primitives, the SATA device link controller 168 stays in the HOLDE state. Once again, newly added transitions are underlined

TABLE 6

| L5: LD_HOLDE | Take vendor-specific protection actions to prevent damage from a high-G or shock event and transmit HOLDA$_P$. |
|---|---|
| 1. Phy layer forwards HOLDE or less than 3 consecutive non-HOLDE have been received. And PHYRDY | → LD_HOLDE |
| 2. More than 3 consecutive HOLD detected and PHYRDY and insufficient FIFO space | → L_HOLD |
| 3. More than 3 consecutive non-HOLDE detected and PHYRDY | → LD_PREV_STATE |
| 4. PHYRDYn | → L_NoCommErr |

In sum, a new SATA link layer primitive, referred to as hold-emergency (HOLDE), is added to the well-known SATA protocol. The HOLDE primitive incorporates the flow-control behavior of the existing HOLD command with the additional new behavior of notifying the hard disk drive to take emergency steps to prepare for impact when a high-g event occurs. A SATA host generates a HOLDE primitive when an accelerometer or other motion sensor predicts a high-g impact event. From a data flow standpoint, the HOLDE primitive acts similarly to the existing HOLD command, however, a SATA device, such as a hard disk drive, responds to a HOLDE primitive by preparing for impact. Such preparation may include parking the read/write heads and spinning down any spinning media. A new state, LH_HOLDE, is added to the SATA host link controller link state machine to extend the host side protocol behavior to accommodate the emergency hold condition. A new state, LD_HOLDE, is also added to the SATA device link controller link state machine to extend the device side behavior to accommodate the emergency hold condition.

By providing emergency impact notification and response at a very low level in the SATA protocol stack (the SATA link layer), extremely low notification latencies are achieved, thus increasing the probability that the hard disk drive can successfully prepare for impact prior to the actual impact. Furthermore, with the impact notification and response mechanism acting within the SATA link layer, software is relieved of the complex and time consuming task of discovering and re-issuing SATA commands that were aborted.

While the forgoing is directed to embodiments of the present invention, other and further embodiments of the invention may be devised without departing from the basic scope thereof, and the scope thereof is determined by the claims that follow.

I claim:

1. A method for protecting a storage device during a high-gravity event, the method comprising:
   receiving a high-gravity event warning signal;
   stopping data transmissions to the storage device over a serial data stream in response to the high-gravity event warning signal;
   transmitting a first HOLDE primitive to the storage device over the serial data stream, wherein the first HOLDE primitive indicates to the storage device to take protective action in response to the high-gravity event warning signal;
   determining that a HOLDA primitive has been received in response to the first HOLDE primitive, wherein the HOLDA primitive is transmitted by the storage device to acknowledge the receipt of the first HOLDE primitive;
   determining whether the high-gravity event is finished; and
   resuming the data transmissions to the storage device over the serial data stream when the high-gravity event is finished, or
   transmitting one or more additional HOLDE primitives to the storage device over the serial data stream when the high-gravity event is not finished and the HOLDA primitive has been received.

2. The method of claim 1, further comprising the step of detecting the high-gravity event.

3. The method of claim 2, further comprising the step of transmitting the high-gravity warning signal to a host interface upon detecting the high-gravity event.

4. The method of claim 1, wherein the storage device is a serial advanced technology attachment (SATA) storage device, and the first HOLDE primitive is a link layer primitive in the SATA link layer protocol.

5. A computer-readable medium storing a set of instructions that when executed by a processing device causes the processing device to protect a storage device during a high-gravity event, by performing the steps of:
   receiving a high-gravity event warning signal;
   stopping data transmissions to the storage device over a serial data stream in response to the high-gravity event warning signal;
   transmitting a first HOLDE primitive to the storage device over the serial data stream, wherein the first HOLDE primitive indicates to the storage device to take protective action in response to the high-gravity event warning signal;
   determining that a HOLDA primitive has been received in response to the first HOLDE primitive, wherein the HOLDA primitive is transmitted by the storage device to acknowledge the receipt of the first HOLDE primitive;
   determining whether the high-gravity event is finished; and
   resuming the data transmissions to the storage device over the serial data stream when the high-gravity event is finished, or
   transmitting one or more additional HOLDE primitives to the storage device over the serial data stream when the high-gravity event is not finished and the HOLDA primitive has been received.

6. The computer-readable medium of claim 5, wherein the storage device is a serial advanced technology attachment (SATA) storage device, and the first HOLDE primitive is a link layer primitive in the SATA link layer protocol.

7. A computing device, comprising:
   a processing unit coupled to a system memory;
   a storage device; and
   a host controller for the storage device having a host link controller configured to:
   receive a high-gravity event warning signal,
   stop data transmissions to the storage device over a serial data stream in response to the high-gravity event warning signal,
   transmit a first HOLDE primitive to the storage device over the serial data stream, wherein the first HOLDE primitive indicates to the storage device to take protective action in response to the high-gravity event warning signal;
   determine that a HOLDA primitive has been received in response to the first HOLDE primitive, wherein the HOLDA primitive is transmitted by the storage device to acknowledge the receipt of the first HOLDE primitive;
   determine whether the high-gravity event is finished, and
   resume the data transmissions to the storage device over the serial data stream when the high-gravity event is finished, or
   transmit one or more additional HOLDE primitives primitive to the storage device over the serial data stream when the high-gravity event is not finished and the HOLDA primitive has been received.

8. The computing device of claim 7, further including a motion sensor configured to detect the high-gravity event.

9. The computing device of claim 8, wherein the motion sensor is an accelerometer.

10. The computing device of claim 8, wherein the motion sensor is configured to transmit the high-gravity warning signal to a host interface upon detecting the high-gravity event.

11. The computing device of claim 7, wherein the storage device is a serial advanced technology attachment (SATA) storage device, and the first HOLDE primitive is a link layer primitive in the SATA link layer protocol.

* * * * *